(No Model.)
C. V. KLIPPERT, L. J. VOGT & H. L. WEILAND.
DEVICE FOR WEIGHING LIQUIDS.
No. 456,959. Patented Aug. 4, 1891.
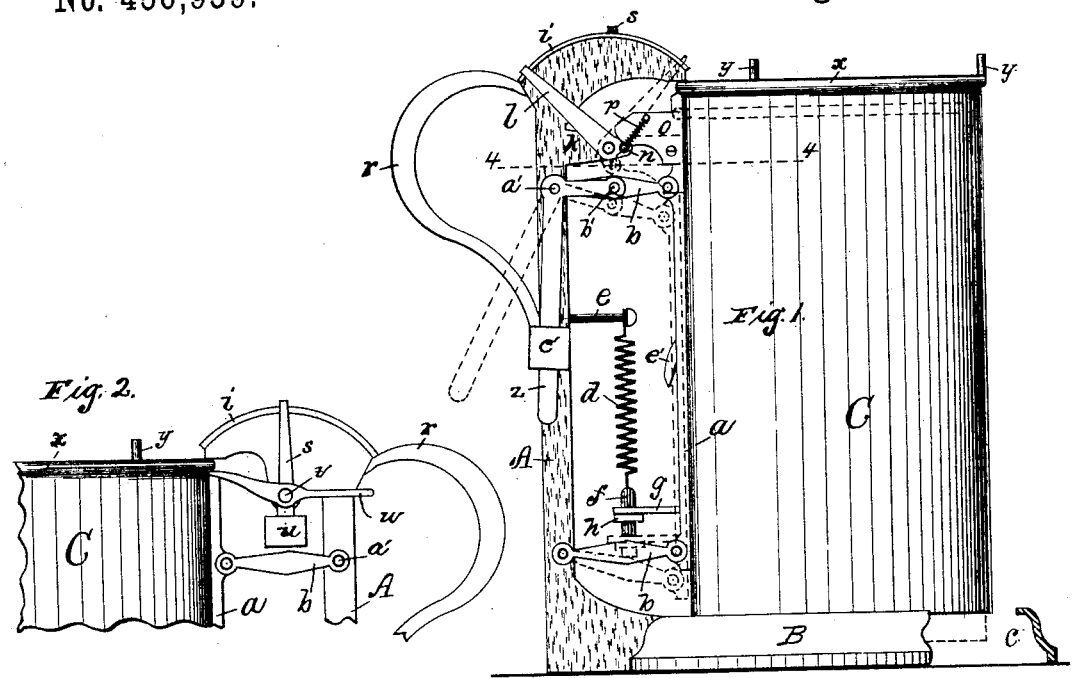
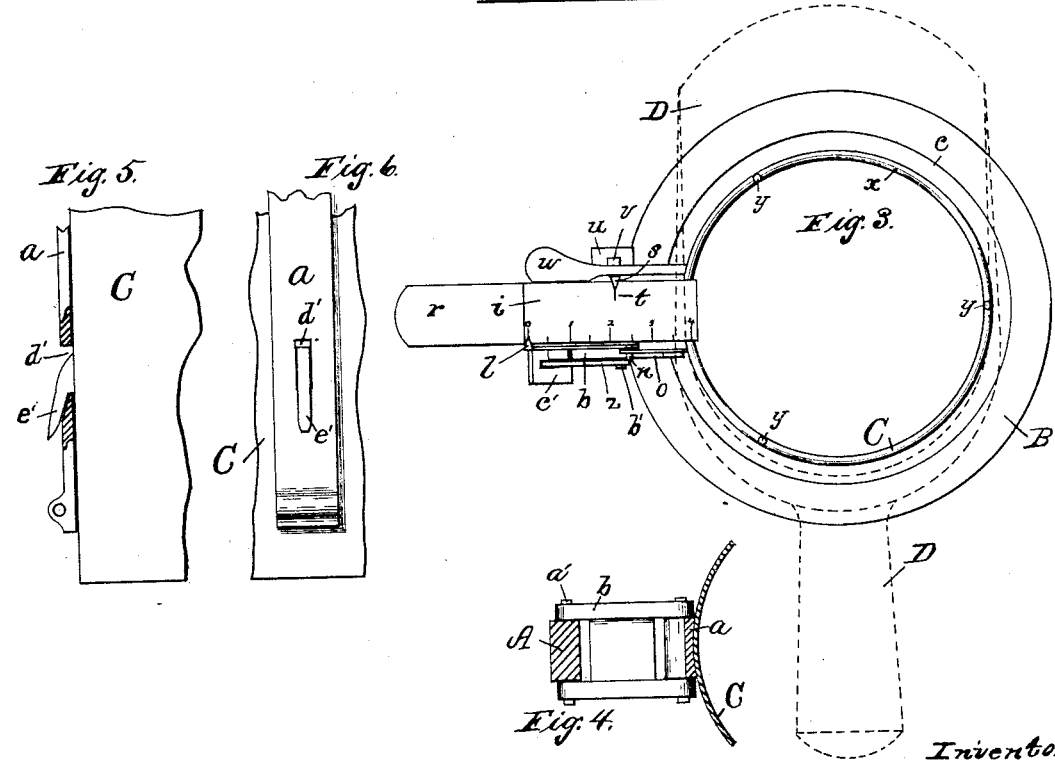

UNITED STATES PATENT OFFICE.

CHARLES V. KLIPPERT, LOUIS J. VOGT, AND HENRY L. WEILAND, OF ROCHESTER, NEW YORK.

DEVICE FOR WEIGHING LIQUIDS.

SPECIFICATION forming part of Letters Patent No. 456,959, dated August 4, 1891.

Application filed July 25, 1890. Serial No. 359,859. (No model.)

*To all whom it may concern:*

Be it known that we, CHARLES V. KLIPPERT, LOUIS J. VOGT, and HENRY L. WEILAND, of Rochester, in the county of Monroe and State of New York, have invented a new and useful Improvement in Devices for Weighing Liquids, which improvement is fully set forth in the following specification and shown in the accompanying drawings.
Our invention is a device for measuring liquids and other substances by means of a weighing-scale, the form and arrangement of parts and the operation of the device being hereinafter fully described, and more particularly pointed out in the claims.

Referring to the drawings, Figure 1 is a side elevation of our improved weighing-measure, parts being shown in two positions by full and dotted lines; Fig. 2, an elevation of some of the parts at the opposite side and near the top of the device; Fig. 3, a plan; Fig. 4, a plan of one of the links, parts being sectioned as on the dotted line 4 4 in Fig. 1; and Figs. 5 and 6 a side and rear elevation, respectively, of certain parts of the device drawn to show a means by which the vessel may be attached to or removed from the frame.

Referring to the parts, A is a vertical standard having a hollow circular base B, which standard forms a rigid support for the parts of the device.

C is a vessel, preferably of sheet metal, for holding the liquid to be weighed, which vessel may be cylindrical in form, as shown, or of any other convenient form. The vessel is preferably joined to a light vertical bar $a$, which is connected to the standard by means of horizontal pivotal links $b\ b$. When thus held, the bottom of the vessel is immediately over or just within the circular space $c$ of the base. The vessel is held up by means of a spiral spring $d$, connected at its upper end with the standard by means of a rigid stud $e$, and connected at its lower end with the vessel by means of an arm $g$. An adjusting-screw $f$, passing through a hole in the arm, is joined immediately with the spring, and is provided with a nut $h$ beneath the arm.
The upper end of the standard is curved and provided with a graduated scale $i$. The standard is also formed with an arm $k$, projecting horizontally toward the vessel, at the end of which arm is pivoted a pointer $l$ in position to traverse the scale. The pointer is provided at its lower end with a pin $n$, and the bar $a$ is provided with an actuator $o$ for the pointer, in position to bear upon the pin to tilt the pointer. A slender spring $p$, connected, respectively, with the pin $n$ and the tilter, serves to keep those two parts in contact and to hold the pointer to its work.

When the vessel is empty, there is little tension upon the spring $d$ and the pointer stands at zero. The weight of liquids that may be placed into the vessel carries the latter downward against the action of the spring and the tilter causes the pointer to move over the scale.

The standard is formed with a rigid grip or handle $r$ on the side opposite the vessel, by means of which the whole device may be carried by the hand or handle, like an ordinary pitcher. For instance, the vessel may be held under a faucet to catch and weigh the outflowing liquid and the latter carried away in it and turned in another vessel, as if the device were a common pitcher.

An auxiliary pointer $s$, Figs. 2 and 3, is provided to point to a single mark $t$ on the scale to indicate to the person holding the device while weighing the liquid when the vessel is truly vertical, so that the weighing may be correctly performed. The pointer $s$ is pendulous, it being provided with a weight $u$ to keep it vertical, and the mark $t$ on the scale is so placed that when the pointer covers it the vessel and the standard are also vertical. Upon the pin $v$, upon which the pointer $s$ turns, Figs. 2 and 3, a thumb-lever $w$ is also pivoted in position to bear at its inner end against the bead $x$ at the top of the vessel. This lever is in position to be pressed by the thumb of the right hand when grasping the handle $r$ in carrying the device. The upper forward part of the standard is made to slightly project over the bead, as shown, so the latter may be pinched between it and the thumb-lever. This holds the vessel firmly and prevents vertical vibrations or jolting on account of the action of the spring resulting from the jar in carrying the vessel about.

Posts $y$ project upward from the top of the vessel to form rests for a scoop D, Fig. 3, or other dish that may be placed thereon, to contain dry substances—as flour, for instance—to be weighed. This renders the device convenient for use in the kitchen to weigh dry substances, as well as liquids.

$z$, Figs. 1 and 3, shows a bent lever hinged on the pin $a'$, rigid with the standard, upon which the upper link $b$ turns. This lever has its short arm pivoted at $b'$ to the middle of said link, by means of which when the link is carried downward from weighting the vessel the long arm of the lever will be swung outward, as indicated by dotted lines.

$c'$ is an adjustable weight on the lever $z$, provided for the purpose of counteracting or balancing the weight of the scoop or dish, so the pointer $l$ may be caused to stand at zero when the weight of the scoop is added to that of the vessel. When the device is used for measuring liquids, the weight is slipped upward to the fulcrum of the lever and rendered inoperative.

We prefer to make the vessel detachable from the standard. One way to accomplish this is to form the bar $a$ with an opening $d'$, Figs. 5 and 6, and provide the vessel with a hook or catch $e'$ to be passed through said opening, as shown. This enables us to use different sizes and kinds of vessels with the device; also, to remove the vessel for the purpose of cleaning and repairs.

What we claim as our invention is—

1. A device for weighing liquids, consisting of a vessel in combination with a stand, a longitudinal bar secured rigidly to the rear side of the vessel, straight pivotal links connecting said bar with the stand, a spring between said stand and bar and connected with both, a scale fixed to the stand, and a pointer for the stand, and a tilter rigid with the vessel to actuate the pointer, substantially as shown.

2. A device for weighing liquids, consisting of a stand and a vessel connected therewith by means of pivotal links, a spring connecting said vessel and stand, a scale and pointer therefor, the latter being actuated by means of said vessel, and an auxiliary pointer $s$, substantially as shown and described.

3. A device for weighing liquids, consisting of a stand and a vessel connected therewith by means of pivotal links, a spring connecting said vessel and stand, a scale and pointer therefor, the latter being actuated by means of said vessel, and a thumb-lever to press the vessel, said stand being provided with a handle, substantially as shown.

4. A device for weighing liquids, consisting of a stand and a vessel connected therewith by means of pivotal links, a spring connecting said vessel and stand, a scale and pointer therefor, an actuator for the pointer connected with the vessel, the latter being provided with posts, and a weighted balancing-lever for the vessel, substantially as and for the purpose set forth.

5. A device for weighing liquids, consisting of a stand and a vessel connected therewith by means of a pivotal link, a spring connecting said vessel and stand, a scale and pointer therefor, an actuator for the pointer connected with the vessel, the latter being detachable from the stand, substantially as and for the purpose specified.

In witness whereof we have hereunto set our hands, this 13th day of June, 1890, in the presence of two subscribing witnesses.

CHARLES V. KLIPPERT.
   LOUIS J. VOGT.
   HENRY L. WEILAND.

Witnesses:
 E. B. WHITMORE,
 M. L. McDERMOTT.